(12) United States Patent
Nadler et al.

(10) Patent No.: US 11,144,665 B2
(45) Date of Patent: Oct. 12, 2021

(54) PURPOSE-BASED DATA ACCESS CONTROL

(71) Applicant: International Business Machines Corporation, Armonk, NY (US)

(72) Inventors: Sima Nadler, Kochav Yair (IL); Sharon Keidar Barner, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 16/161,105

(22) Filed: Oct. 16, 2018

(65) Prior Publication Data
US 2020/0117827 A1 Apr. 16, 2020

(51) Int. Cl.
G06F 21/62 (2013.01)
H04L 9/08 (2006.01)
H04L 29/06 (2006.01)

(52) U.S. Cl.
CPC .......... *G06F 21/6245* (2013.01); *H04L 9/088* (2013.01); *H04L 63/10* (2013.01)

(58) Field of Classification Search
CPC ... G06F 21/6245; H04L 9/088; H04L 9/0822; H04L 9/3239; H04L 63/10; H04L 63/0428; H04L 63/061; H04L 2209/38; H04L 2209/805
See application file for complete search history.

(56) References Cited

U.S. PATENT DOCUMENTS

| | | | |
|---|---|---|---|
| 8,275,632 B2 | 9/2012 | Awaraji et al. | |
| 8,904,503 B2 | 12/2014 | Agbabian | |
| 9,547,720 B2 | 1/2017 | Hang et al. | |
| 9,769,124 B2 | 9/2017 | Yan | |
| 2009/0254572 A1* | 10/2009 | Redlich | G06Q 10/107 |
| 2012/0173881 A1* | 7/2012 | Trotter | H04L 9/0894 713/189 |
| 2017/0054721 A1* | 2/2017 | Meriac | H04W 12/02 |
| 2017/0264619 A1* | 9/2017 | Narayanaswamy | G06F 21/6209 |
| 2018/0020001 A1* | 1/2018 | White | G06F 21/604 |

(Continued)

OTHER PUBLICATIONS

Riccardo De Masellis et al., "A Declarative Framework for Specifying and Enforcing Purpose-Aware Policies", International Workshop on Security and Trust Management, 2015, pp. 55-71.

(Continued)

*Primary Examiner* — Kevin Bechtel
*Assistant Examiner* — Hamid Talaminaei
(74) *Attorney, Agent, or Firm* — Ziv Glazberg (57) ABSTRACT

Method, apparatus and product for purpose-based data access control. Having a data about a subject, for which usage is approved for a purpose, a first encryption key associated with the first purpose is obtained. A link pointing to a first alias of the data is generated, the first alias being associated with the first purpose. The link pointing to the first alias is encrypted with the first encryption key to obtain a first encrypted link; and access is provided to the first encrypted link, whereby access to the data is obtainable by decrypting the first encrypted link with the first decryption key to obtain the first alias and using the first alias to access the data. In some cases, a second link for a second can be similarly generated. Upon revocation of approval, a corresponding alias is eliminated to prevent access thereby. The links may be retained in a decentralized ledger, such as a blockchain.

20 Claims, 5 Drawing Sheets

(56) References Cited

U.S. PATENT DOCUMENTS

2018/0167400 A1* 6/2018 Vas .................. H04L 51/08
2020/0034548 A1* 1/2020 Wu .................. H04L 63/20
2021/0150051 A1* 5/2021 van't Noordende .... H04L 63/18

OTHER PUBLICATIONS

David W. Chadwick et al., "A privacy preserving authorisation system for the cloud", Journal of Computer and System Sciences, Sep. 2012, vol. 78, Issue 5, pp. 1359-1373.
Pietro Colombo et al., "Privacy Aware Access Control for Big Data: A Research Roadmap", Big Data Research, Dec. 2015, vol. 2, Issue 4, pp. 145-154.
Thomas Szyrkowiec et al., "First Demonstration of an Automatic Multilayer Intent-Based Secure Service Creation by an Open Source SDN Orchestrator", 42nd European Conference and Exhibition on Optical Communications, Sep. 18-22, 2016, pp. 31-33, Düsseldorf.
Ji-Won Byun et al., "Purpose based access control of complex data for privacy protection", SACMAT '05 Proceedings of the tenth ACM symposium on Access control models and technologies, 2005, pp. 102-110.
Amirreza Masoumzadeh et al., "PuRBAC: Purpose-Aware Role-Based Access Control", OTM Confederated International Conferences "On the Move to Meaningful Internet Systems", 2008, pp. 1104-1121.

* cited by examiner

PURPOSE-BASED DATA ACCESS CONTROL

TECHNICAL FIELD

The present disclosure relates to data protection in general, and to control and management of data access in accordance with authorized usage purposes, in particular.

BACKGROUND

In a myriad of practical applications and daily life scenarios, privileged information may be collected, stored, transferred, and used, thus giving rise to various data protection or privacy concerns. The privileged information may be, for example, personal information allowing either on its own or together with other information to identify or locate a single person or individual in context, or otherwise sensitive information, such as medical or financial data, the subject thereof may wish to keep confidential. With the advent of the so-called information highway and ubiquity of technologies such as the Internet-of-Things (IoT), wearable sensor systems and likewise network connectivity enabled devices, it may be more and more often the case where private data is generated at one location and transferred to another location, or even to a different entity, for processing or further usage. For example, a glucose monitor may track blood sugar level of a patient and transmit the measured values to a health center for supervision and care, or an in-vehicle computer may relay telemetry signals to a remote traffic management system for enhancing route planning and driver safety. There is thus a growing concern and risk that private data will be subject to unauthorized use, such as by an unauthorized third party, or for unauthorized purposes, even by a same entity which may acquire authorized access to the data for a declared purpose, yet may then exploit it for other unrelated ones.

BRIEF SUMMARY

One exemplary embodiment of the disclosed subject matter is a method comprising: having data of a subject, wherein an approval for usage of the data for a first purpose is provided; obtaining a first encryption key associated with the first purpose, wherein a first decryption key is required for decrypting information encrypted with the first encryption key; generating a link pointing to a first alias of the data, the first alias being associated with the first purpose; encrypting the link pointing to the first alias with the first encryption key to obtain a first encrypted link; and providing access to the first encrypted link, whereby access to the data is obtainable by decrypting the first encrypted link with the first decryption key to obtain the first alias and using the first alias to access the data.

Optionally, responsive to withdrawing approval for usage of the data for the first purpose, eliminating usability of the first alias to access the data, whereby access to the data via the link pointing to the first alias is prevented.

Optionally, said eliminating usability of the first alias comprises modifying the first alias to point to a different data than the data or to not point to any data.

Optionally, after said eliminating, the link pointing to the first alias is obtainable, whereby access to the data via the link is prevented by the first alias being unusable.

Optionally, responsive to receiving approval for usage of the data for a second purpose, performing the steps of: obtaining a second encryption key associated with the second purpose, wherein a second decryption key is required for decrypting information encrypted with the second key; generating a link pointing to a second alias of the data, the second alias is different than the first alias, the second alias being associated with the second purpose; encrypting the link pointing to the second alias with the second encryption key to obtain a second encrypted link; and providing access to the second encrypted link, whereby access to the data is obtainable by decrypting the second encrypted link with the second decryption key to obtain the second alias and using the second alias to access the data.

Optionally, responsive to withdrawing approval for usage of the data for the second purpose, eliminating usability of the second alias to access the data, whereby access to the data via the link pointing to the second alias is prevented while access to the data via the link pointing to the first alias is maintained.

Optionally, responsive to withdrawing approval for usage of the data for the first purpose, eliminating usability of the first alias to access the data, whereby access to the data via the link pointing to the first alias is prevented while access to the data via the link pointing to the second alias is maintained.

Optionally, said providing access to the first encrypted link is performed using a decentralized ledger, whereby the link pointing to the first alias of the data becomes permanently obtainable from an undeletable record in the decentralized ledger.

Optionally, preventing access to the data is achieved responsive to a withdrawal of approval or a change in policy of usage of the data for the first purpose by rendering the first alias to be unusable.

Optionally, distribution of the first decryption key to one or more recipients is performed by a Purpose Certification Authority (PCA) module configured for enforcing data usage policy on each recipient, whereby usage of data accessed by the recipient via the link pointing to the first alias is enabled for the first purpose and prevented for a purpose different than the first purpose.

Optionally, access to the data is provided in a black-box computing environment configured for processing the data to obtain an output, whereby enabling obtaining the output without obtaining the data.

Optionally, the approval for usage of the data for a first purpose is provided by the subject or per policy.

Another exemplary embodiment of the disclosed subject matter is an apparatus having a processor and coupled memory, the processor being adapted to perform: having data of a subject, wherein an approval for usage of the data for a first purpose is provided; obtaining a first encryption key associated with the first purpose, wherein a first decryption key is required for decrypting information encrypted with the first encryption key; generating a link pointing to a first alias of the data, the first alias being associated with the first purpose; encrypting the link pointing to the first alias with the first encryption key to obtain a first encrypted link; and providing access to the first encrypted link, whereby access to the data is obtainable by decrypting the first encrypted link with the first decryption key to obtain the first alias and using the first alias to access the data.

Yet another exemplary embodiment of the disclosed subject matter is a non-transitory computer readable medium retaining program instructions, which program instructions when read by a processor, cause the processor to perform: having data of a subject, wherein an approval for usage of the data for a first purpose is provided; obtaining a first encryption key associated with the first purpose, wherein a first decryption key is required for decrypting information encrypted with the first encryption key; generating a link pointing to a first alias of the data, the first alias being associated with the first purpose; encrypting the link pointing to the first alias with the first encryption key to obtain a first encrypted link; and providing access to the first encrypted link, whereby access to the data is obtainable by decrypting the first encrypted link with the first decryption key to obtain the first alias and using the first alias to access the data.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is to protect data from unauthorized access or use. A subject of the data may specify which entities are permitted to use the data and for what purposes. Access by an unauthorized entity or usage for an unauthorized purpose should be prevented. For example, a patient may authorize use of data acquired by a glucose monitor for a medical purpose, e.g. treatment of diabetes, but not for a commercial purpose, such as targeted advertising to purchase insulin products, or the like. Similarly, a mobile phone user may consent that geo-location data be collected and used by navigational services but not by advertising services, for insurance policy monitoring, or the like. Similarly, data usage policies or laws may dictate for what purposes personal data may be used.

Another technical problem dealt with by the disclosed subject matter is to manage access and usage permissions specified by the data subject, which may change over time. In some cases, the data subject may wish to revoke a previous authorization. In some cases, a data subject may withdraw from a previously given consent to a particular use. For example, the user may initially agree to the data being used for advertising services but later may wish to retract from it and deny such usage from that point and onwards. It is desired that any updates to the permitted uses policy be carried out in an efficient manner Changes to laws or enterprise data usage policies may also change the purposes for which the personal data may be used.

It is further desired to enable usage of a decentralized ledger for managing the purpose-based access. However, as decentralized ledgers are persistent and comprise undeletable records, any information stored thereon remains obtainable, at least from a historic record. The disclosed subject matter addresses the technical problem of effectively deleting the information from the persistent decentralized ledger.

Yet another technical problem dealt with by the disclosed subject matter is to conserve computing and storage resources involved in enforcement of data protection and authorized use policy.

One technical solution is to employ purpose-based data encryption and decryption, and provide access to the data for an authorized purpose in encrypted form, such that it can be decrypted only by actors presumed as being compliant with the authorized usage purpose.

In some exemplary embodiments, distribution of purpose-based encryption and decryption keys, as well as establishment and management of suitable purpose taxonomy and registry, may be performed by a specialized regulatory actor, referred to herein as a Purpose Certification Authority (PCA), which may utilize a PCA module. For example, for each recognized data usage purpose, the PCA module may generate and maintain a tuple (Purpose_ID, Purpose_Enc_Key, Purpose_Dec_Key), wherein Purpose_ID uniquely identifies the purpose (e.g., an assigned serial number or code), Purpose_Enc_Key serves to encrypt information the use of which is intended to be limited to that purpose only, and Purpose_Dec_Key serves to decrypt information encrypted with Purpose_Enc_Key. In particular, only an entity in possession of Purpose_Dec_Key may be able to decrypt the encrypted information encrypted with Purpose_Enc_Key.

In some exemplary embodiments, the purpose-based encryption and decryption keys, Purpose_Enc_Key and Purpose_Dec_Key, may be a public-private key pair in an asymmetrical cryptographic system, such as the public key cryptography schemes of RSA, ElGamal, or the like. In the context of the present disclosure, an encryption key may also be referred to interchangeably as a public key, and, similarly, a decryption key may also be referred to interchangeably as a private key.

In some exemplary embodiments, the PCA may certify and enforce compliance of actors with a data usage policy. The PCA may manage a plurality of registered entities, one or more of which being data providers and the other being data processors. The PCA module may maintain a public key and a private key for each authorized purpose. The PCA module may distribute the purpose-associated public keys to the data providers, so as to allow a data provider to encrypt purpose-specific information using the purpose's public key, and may grant data processors with a key for decrypting the information for the specified purpose, i.e. the purpose's private key, where the PCA module may be able to ensure that a data processor granted with the private key uses the decrypted information for the specified purpose only. The certification and enforcement of purpose compliance of the data processors by the PCA may be performed similarly as described in U.S. patent application Ser. No. 15/276,815, entitled "Digital certificate for verifying application purpose of data usage", filed on Sep. 27, 2016 and/or in U.S. patent application Ser. No. 15/397,753, entitled "Purpose-Based Control of Data Used by Computer Software Applications", filed on Jan. 4, 2017, both of which are hereby incorporated by reference in their entirety without giving rise to disavowment.

In some exemplary embodiments, each data processor may be provided with its own individual public-private key pair, allowing to encrypt information so that only the data processor may decrypt it. The PCA module may use the data processor's own public key to encrypt a purpose's private key granted thereto, so as to avoid misappropriation of the private key by unauthorized entities. The PCA module may be in charge of generation, distribution and management of individual keys, purpose keys, or the like. The PCA module may also manage expiry of keys and distribution of new keys, for example if a processing entity has been found to be in breach, thus preventing the use of personal data for a particular purpose.

In some exemplary embodiments, authorization of using data for a specific purpose may be granted to a specific data processor. In order of enforcing such exclusive use, a compound key, comprised of both the data processor's own public key and the purpose's public key, may be used to encrypt information aimed at the data processor for this use. A "box in a box" encryption approach may be applied accordingly, wherein information may be encrypted first with the purpose public key, and then re-encrypted with the data processor's own public key.

In some exemplary embodiments, the PCA module may be coupled to or be in communication with a Privacy Portal configured for receiving and managing privacy preferences relating to a data subject. In some exemplary embodiments, the Privacy Portal may enable the data subject to indicate her privacy preferences and update them at her will. The data subject may indicate via the Privacy Portal for what purposes the data may be used, and optionally which specific data processor are authorized to use the data for a specified purpose. Additionally or alternatively, the Privacy Portal may be used by other actors different than the data subject, such as a guardian thereof, an administrator of an organization of which the data subject is member, or the like. The Privacy Portal may be configured to store the privacy preferences, provide the preferences to participating entities, such as data providers or the like, and enable change of the preferences by the data subject or other actors having sufficient permissions, such as addition or deletion of purposes for which use of the data is permitted. The Privacy Portal may also manage laws and enterprise policies indicating how personal data may be used, including (but not limited to) whether input from the data subject should be obtained.

Another technical solution is to maintain purpose-based aliases of the data that can be added or removed in accordance with authorization of specific usage purposes or withdrawal thereof by the data subject.

In some exemplary embodiments, an alias designated for a specified usage purpose may be created for the data. The alias may be, for example, a pointer or reference to a location where the data is stored, e.g. a memory address. A purpose-based encryption key, designated for the specified usage purpose, may be obtained and used to encrypt a link to the alias. The link may be, for example, a Uniform Resource Locator (URL) pointing to the alias, e.g. a domain name or host server address and path in a file system, or the like. The encrypted link may be decrypted, using a corresponding purpose-based decryption key, in order to obtain the alias and gain access to the data.

In some exemplary embodiments, for each of a plurality of authorized purposes a different alias of the data may be instated by the data holder, and a corresponding encrypted link encrypted with the public key of the respective purpose may be provided thereby. As an illustrative example, assume the data subject authorized use of the data for either purpose A or purpose B. Two aliases of the data each associated with one of the purposes, i.e. alias A associated with purpose A, and alias B associated with purpose B, may be created. A first encrypted link, link A, may be obtained by encrypting a link pointing to alias A with public key of purpose A, and, a second encrypted link, link B, may similarly be obtained by encrypting a link pointing to alias B with public key of purpose B. The two encrypted links, link A and link B, may be provided by the data holder to entities requesting access to the data, such as service providers interested in using the data, data processors, or the like. Only entities that are certified for using the data for the authorized purpose and therefore possess the purpose's private key may be able to decrypt the encrypted link, obtain the alias and gain access to the data. For example, a first service provider certified for purpose A may be able to decrypt link A to obtain alias A. Similarly, a second service provider certified for purpose B may be able to decrypt link B to obtain alias B.

In some exemplary embodiments, responsive to the data subject withdrawing authorization or a change in policy or law for a purpose previously authorized, the alias associated with that purpose may be deleted or otherwise removed in a manner preventing usage thereof for accessing the data, such as by nullifying the alias or amending it to point to a different location. Using the same illustrative example, assume the data subject retracts from the authorization of purpose A. The alias A may be deleted in response, thereby preventing the first service provider from accessing the data via link A, despite having decrypted it. In the same time, alias B may remain active, thus allowing the second service provider to continue accessing the data.

In some exemplary embodiments, a decentralized ledger, such as Blockchain or the like, may be used for distribution of either the purpose-based public keys, the encrypted links, or both. The concept of decentralized ledger generally relates to a public medium where parties can post messages or data, and once posted, this data cannot be deleted or augmented. Moreover, this ledger is authenticated such that a party reading data can verify that it is indeed the correct ledger (and not an imposter). Specifically, the Blockchain technology comprises a distributed database maintaining a continuously growing list of records (blocks), each of which containing a timestamp and link to a predecessor block, such that data in any given block cannot be altered retroactively without alteration of all subsequent blocks and collusion of the network majority. The decentralized ledger and encrypted links published thereon may be useful, for example, in conducting audits or enquiries concerning data usage, identity of entities that may have acquired access to it, or the like. As a result, once a link is listed in the decentralized ledger, it cannot be deleted. Hence, link A from the previous example, cannot be deleted from the decentralized ledger. Link A would continue to be obtainable, at least from a historic record in the decentralized ledger. As a result, a service provider certified for purpose A may be able to obtain link A from the decentralized ledger and decrypt such link (as the link is encrypted using an encryption such service provider can decrypt) even after the revocation of the approval to use the data for purpose A. However, as link A links to alias A, which is not retained in the decentralized ledger, the disclosed subject matter may prevent access to the data by eliminating the usability of alias A, e.g., deleting alias A or aliasing to a different location than that which retains the data.

One technical effect of utilizing the disclosed subject matter is to provide data protection against unauthorized use, while obviating a need for encrypting the data itself, communicating or replicating it into additional copies, thereby conserving overall resources in terms of computation time, transmission bandwidth, storage space, and the like.

Another technical effect of utilizing the disclosed subject matter is to allow dynamic and efficient management of data usage permissions and updates thereto, including extensions or withdrawals of consent by the data subject. The disclosed subject matter supports an instant implementation of changes to the list of authorized purposes and/or entities, without requiring distribution of new cryptographic keys or relocation of the data.

It will be appreciated that since the data aliases and the links thereto are both mere indications of location where information may be at, e.g. a memory address, a web address, or the like, they may be expected to have a limited, substantially constant size. As a result, the disclosed subject matter enables maintenance and enforcement of a data protection policy at a minimum overhead.

It will be appreciated that, while the disclosed subject matter may be described and exemplified with relation to purpose-based or identity-based restriction of data usage, the disclosed subject matter is not meant to be so limited, and may be applied to other restriction types as well. For example, service providers may be ranked according to their compliance with some privacy standards and access authorizations may be granted based on the ranking. The "box in a box" approach as discussed herein may be applied so that encrypted information may be decrypted only by service providers with a specified rank or higher. Additionally or alternatively, location-based restrictions, e.g. geo-fencing or the like, may be employed so as to limit data usage to service providers in a specified location only.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Figure 1A:
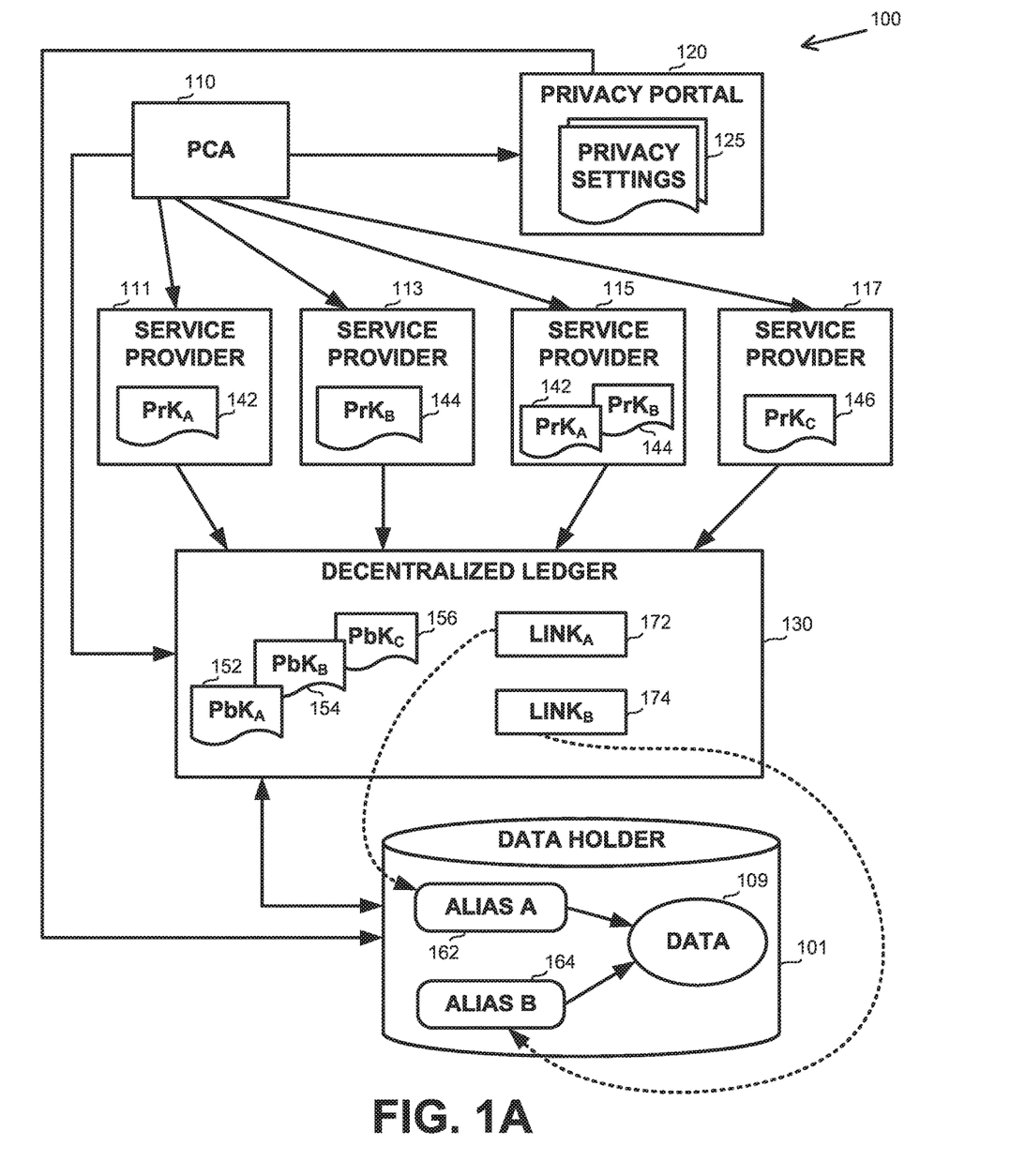
FIGS. 1A-1B show a schematic illustration of an exemplary environment and architecture in which the disclosed subject matter may be utilized, in accordance with some exemplary embodiments of the disclosed subject matter.
Figure 1B:
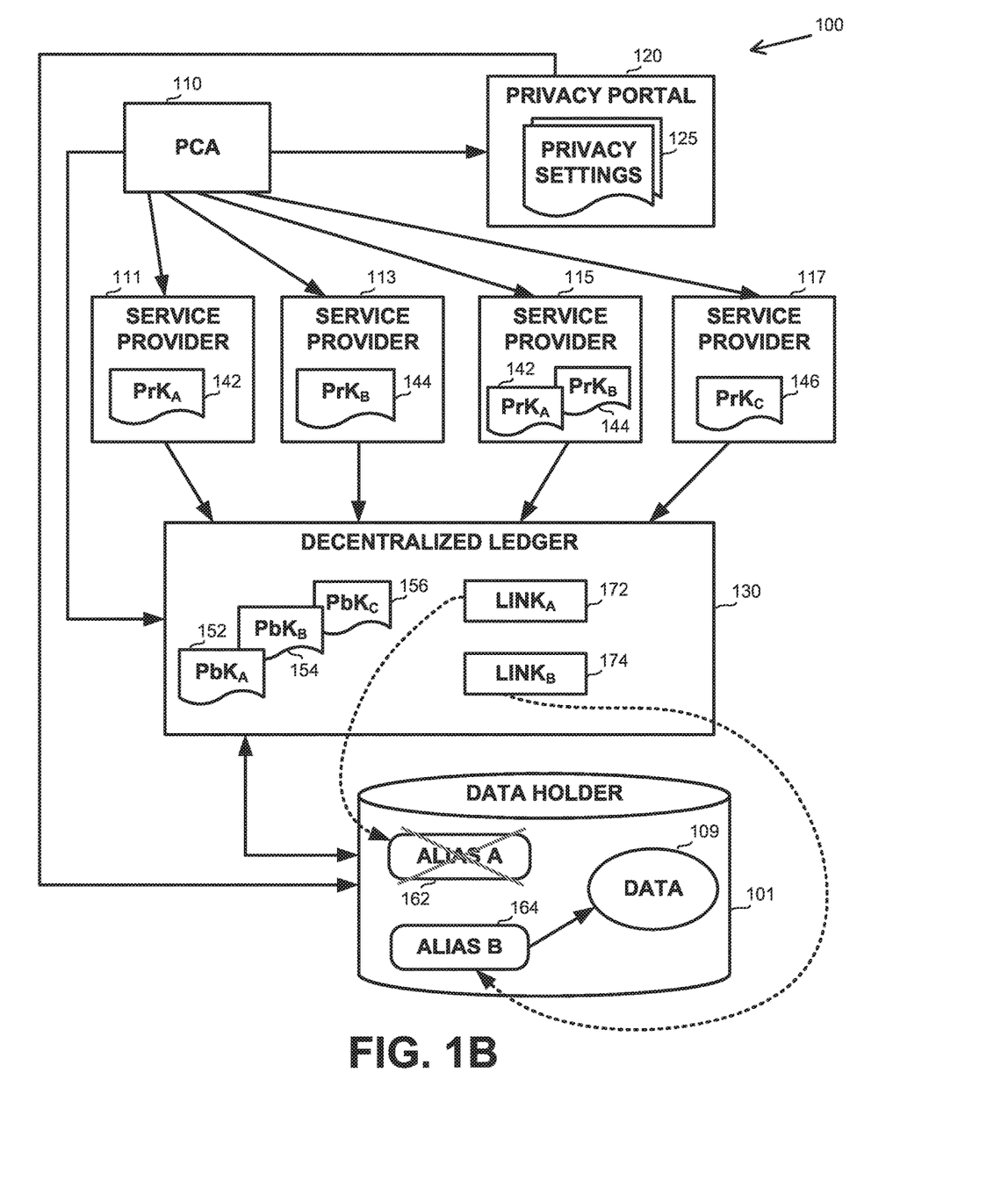

Referring now to FIGS. 1A-1B showing a schematic illustration of an exemplary environment and architecture in which the disclosed subject matter may be utilized, in accordance with some exemplary embodiments of the disclosed subject matter.

Environment 100 may comprise a Data Holder 101 retaining Data 109. Data Holder 101 may be a storage server, a network-associated storage device, a data center, a database, or the like. Environment 100 may comprise a Purpose Certification Authority (PCA) Module 110 configured for certifying and enforcing compliance with authorized usage purposes, and a Privacy Portal 120 configured for receiving definitions and updates of authorized purposes and/or entities. PCA Module 110 may manage a registry of purposes, in accordance with a defined taxonomy, and a cryptosystem of respective public and private key pairs designated for the registered purposes. The taxonomy of purposes may be shared by PCA Module 110 with Privacy Portal 120 for ensuring overall consistency and compatibility thereamong. Privacy Portal 120 may receive the usage permissions from a subject of Data 109, or another user on the subject's behalf, or from privacy policies and retain them in Privacy Settings 125.

Environment 100 may comprise one or more entities that may be interested in using Data 109, such as Service Providers 111, 113, 115 and 117. The PCA may certify each of Service Providers 111, 113, 115 and 117 to one or more purposes, and have PCA module 110 provide them with each of the respective purposes' private keys accordingly, denoted herein as $PrK_X$, where X stands for the purpose to which the key belongs. For example, as illustrated in FIGS. 1A-1B, Service Provider 111 may be certified for purpose A and granted $PrK_A$ 142, Service Provider 113 may be certified for purpose B and granted $PrK_B$ 144, Service Provider 115 may be certified for both purpose A and purpose B and granted $PrK_A$ 142 and $PrK_B$ 144, and Service Provider 117 may be certified for purpose C and granted $PrK_C$ 146.

In some exemplary embodiments, Environment 100 may comprise a Decentralized Ledger 130. PCA Module 110 may use Decentralized Ledger 130 to publish respective public keys of the registered purposes, denoted herein as $PbK_X$, where X stands for the designated purpose. For example, as illustrated in FIGS. 1A-1B, Decentralized Ledger 130 may comprise $PbK_A$ 152 of purpose A, $PbK_B$ 154 of purpose B, and $PbK_C$ 156 of purpose C, as provided by PCA Module 110. Alternatively, PCA Module 110 may provide the public keys directly to Data Holder 101, to data providers, or to other authorized interested parties.

Privacy Portal 120 may provide an indication of purposes for which usage of Data 109 is permitted, as specified in Privacy Settings 125. A data provider (not shown) interested in providing data to be used in accordance with the Privacy Settings 125, may create an alias of Data 109 for each authorized purpose. For example, as illustrated in FIG. 1A, data provider may create Alias A 162 for purpose A and Alias B 164 for purpose B, where purposes A and B are authorized and purpose C is unauthorized according to Privacy Settings 125. Data provider may create for each alias a link and encrypt the link with the public key of the respective purpose, which encrypted link thereby obtained is denoted herein as $Link_X$ where X stands for the designated purpose. For example, as illustrated in FIGS. 1A-1B, Decentralized Ledger 130 may retain $Link_A$ 172 to Alias A 162 and $Link_B$ 174 to Alias B 164. Data provider may publish the data for usage using Decentralized Ledger 130. It is noted that once the links are published in Decentralized Ledger 130 they are permanently available and cannot be deleted therefrom. In some cases, the ledger may be updated to delete the links. However, historic records of the ledger may include an older version thereof in which the links were retained therein. As a result, the links may remain obtainable from Decentralized Ledger 130 even after they are modified and removed from a current version of the ledger.

When a service provider wishes to utilize data, it may attempt to obtain it. For example, Service Provider 111 being certified for purpose A, has access to $PrK_A$ 142. Service Provider 111 may utilize $PrK_A$ 142 to decrypt $Link_A$ 172 retained on Decentralized Ledger 130. After the link is decrypted, Service Provider 111 is able to access Alias A 162, and using Alias A 162, to access Data 109.

Service Provider 113, on the other hand, may be unable to gain access to Alias A 162, it does not have the appropriate decryption key required to decrypt $Link_A$ 172. Instead, Service Provider 113 is able to gain access to Alias B 164, via $Link_B$ 174 using $PrK_B$ 144.

Service Provider 115 may gain access to Data 109 via either $Link_A$ 172 or $Link_B$ 174, as Service Provider 115 has both relevant keys, in view of it being certified for purposes A and B.

Lastly, Service Provider 117 is unable to access and use Data 109, as it does not have access to any relevant key for the data. This is because Service Provider 117 is certified for a purpose for which Data 109 is not authorized to be used.

Referring now to FIG. 1B, in which the authorization of purpose A is revoked. As Link$_A$ 172 is persistent in Decentralized Ledger 130 and cannot be deleted therefrom, any service provider, such as 111, 115, being certified for purpose A can still obtain Link$_A$ 172 and decrypt it to reach Alias A 162. However, after revocation of Purpose A for Data 109, Alias A 162 is rendered unusable to reach Data 109. Alias A 162 may be, for example, a URL or a pointer, which may be nullified, set to a different location, or the like. As Alias A 162 is not retained in the Decentralized Ledger 130, only the current version thereof may be accessible. As a result, traversing Link$_A$ 172 to reach Alias A 162 may not assist the service provider in obtaining Data 109.

It is noted, that Alias B 164 remains unmodified. As a result, each service provider being certified for purpose B may still reach Data 109 using Link$_B$ 174 and Alias B 164.

It is further noted that the withdrawal of authorization for Data 109 is handled in O(1) computational complexity, by modifying a single data item (an alias, and in the illustrated example, Alias A 162). It is not required to modify the encryption keys and to re-encrypt any data item, link, or pointer. This is as opposed to some naïve implementations in which in order to revoke access, each encryption key is modified and each data item needs to be re-encrypted using the new key.

Figure 2A:
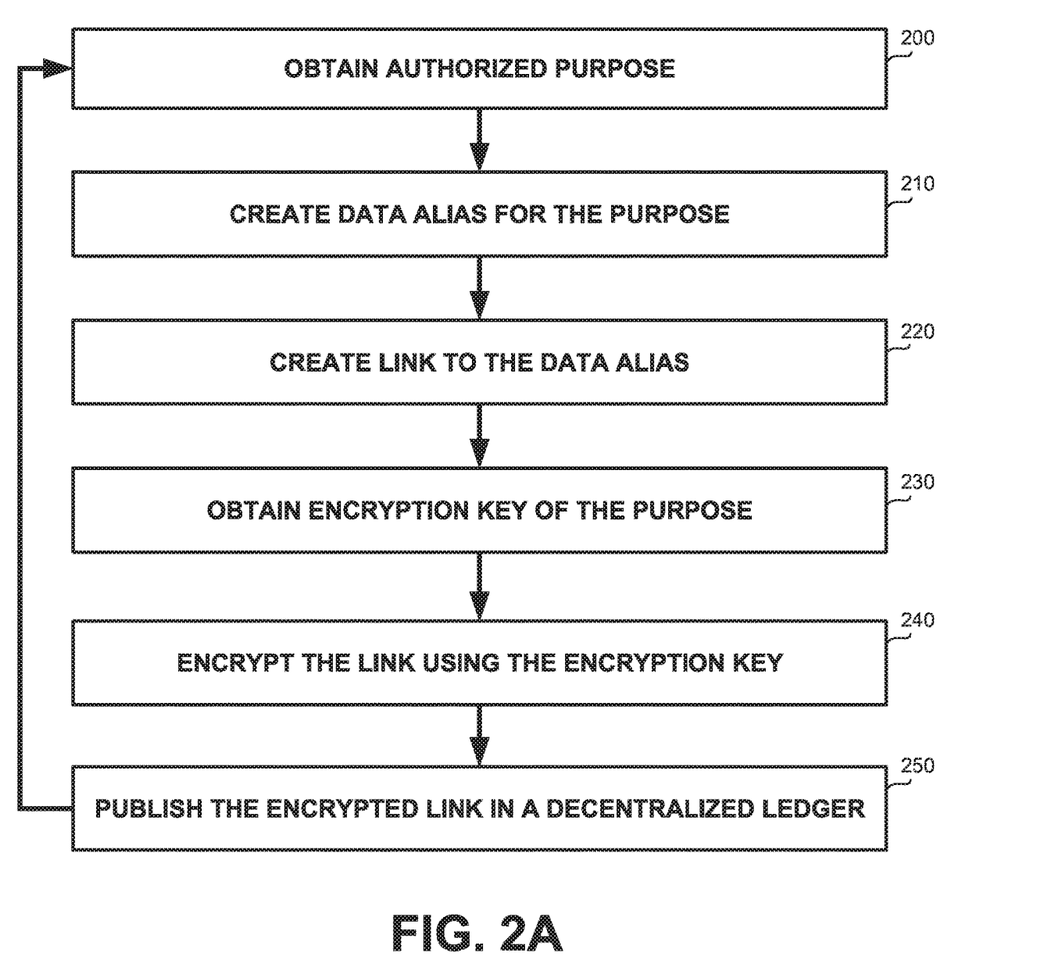
FIG. 2A shows a flowchart diagram of a method, in accordance with some exemplary embodiments of the disclosed subject matter.

Referring now to FIG. 2A showing a flowchart diagram of a method of publishing data for usage, in accordance with some exemplary embodiments of the disclosed subject matter.

On Step 200, an authorized purpose of the data may be obtained. In some exemplary embodiments, the authorized purpose may be obtained from a privacy portal. The authorized purpose may be set based on the type of data, the origin of the data, to subject of the data, or the like. In some exemplary embodiments, there may be a plurality of authorized purposes. Each purpose may be processed individually on Steps 210-250.

On Step 210, a data alias for the data may be created. The data alias may be designated to be used for the authorized purpose obtained in Step 200. The data alias may point to the location where the data is retained, such as in a data server, a data store, a database, or the like. The data alias may be retained in the same storage medium retaining the data or in a different storage medium.

On Step 220, a link to the data alias may be created. The link may point to the location where the alias is retained, such as in a data server, a data store, a database, or the like.

On Step 230, an encryption key of the purpose may be obtained. The encryption key may be a public key of the purpose that is published. Additionally or alternatively, the encryption key may be obtained from a PCA module, such as 110 of FIG. 1A.

On Step 240, the link created on Step 220 may be encrypted using the encryption key obtained on Step 230. The encrypted link may be decryptable using a decryption key that is obtainable to service providers that are certified for the authorized purpose. It is noted that the link may be relatively much smaller than the data itself. For example, a 4 KB pointer may be used to point to a 1028 KB block. As another example, a URL may be represented using a relatively small amount of memory, for example 500×256 Bytes (up to 500 characters, where each character uses 256 Bytes), which is 125 KB. The URL itself may point to files retaining a large amount of data, such as 100 MB or even more. As the encryption is performed on the link itself and not the data, and as the link is relatively smaller than the data in terms of memory requirements, the memory inefficiency caused by the encryption is relatively limited. For example, if an encryption requires an addition of about 20% more data, encrypting the 100 MB file would add 20 MB, while encrypting the URL would only add 25 KB. As another example, encrypting the pointer adds 0.8 KB, while encrypting the block adds more than 200 KB.

On Step 250, the encrypted link is published in a decentralized ledger, such as 130 of FIG. 1A. After the publication of the encrypted key, the encrypted key may be obtained by any process having access to the ledger. In some exemplary embodiments, the ledger may maintain the information persistently and may not be removed from the ledger. As a result, any process having the decryption key associated with the authorized purpose may be capable of obtaining the encrypted link, decrypt it, and reach the data alias.

Figure 2B:
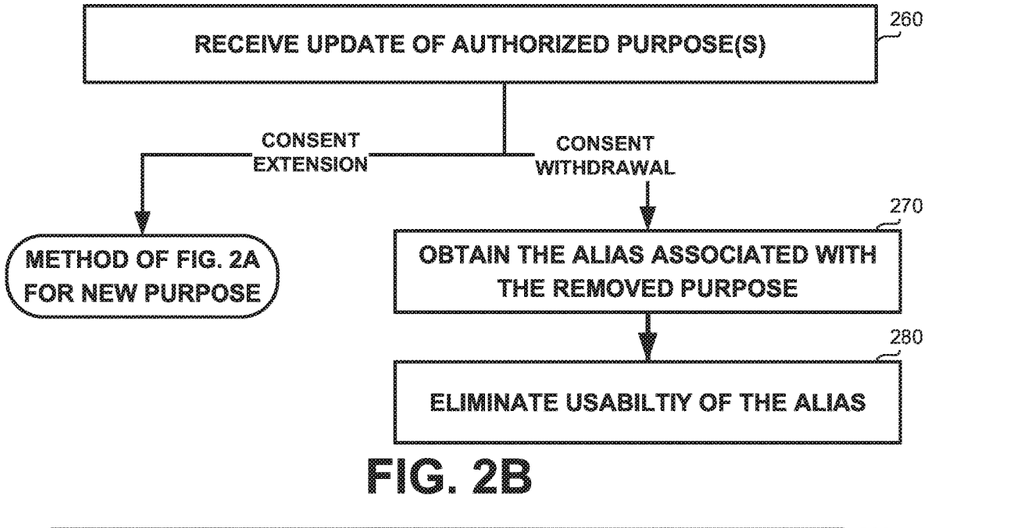
FIG. 2B shows a flowchart diagram of a method, in accordance with some exemplary embodiments of the disclosed subject matter.

Referring now to FIG. 2B showing a flowchart diagram of a method of modifying authorized purposes of a data, in accordance with some exemplary embodiments of the disclosed subject matter.

On Step 260, an update of the list of authorized purposes for a data item may be obtained. The update may be obtained from a privacy portal, such as 120 of FIG. 1A. The update may be initiated by the subject of the data, by an administrator, or by another user.

For any new purpose that is now authorized due to the update, the method of FIG. 2A may be performed.

For any purpose that was previously authorized and for which authorization was withdrawn, referred to herein as removed purpose, Steps 270-280 may be performed. On Step 270, the alias of that data that is associated with the removed purpose may be obtained. On Step 280, usability of the alias may be eliminated. For example, the alias may be a pointer which may be nullified. Additionally or alternatively, the alias may be a pointer which may be changed to point to a default location. Additionally or alternatively, the alias may be a URL which may be modified to point to a non-existing resource. Additionally or alternatively, the alias may be a URL which may be modified to point to a predetermined location such as a default web document visually indicating that authorization was revoked.

Figure 3:
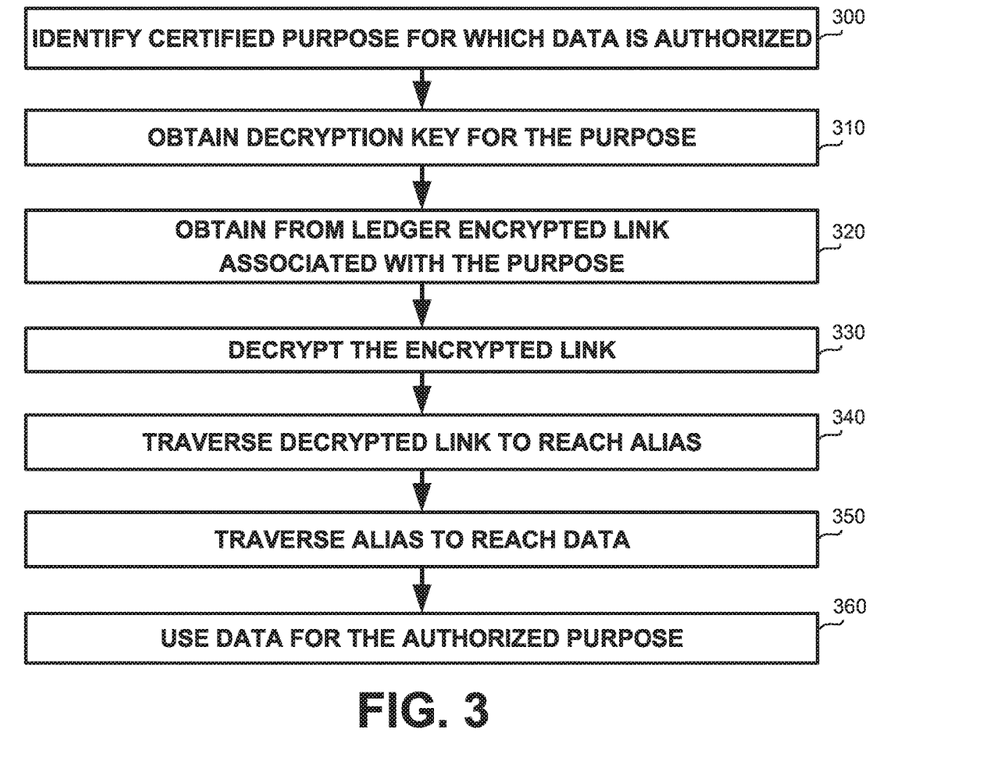
FIG. 3 shows a flowchart diagram of a method, in accordance with some exemplary embodiments of the disclosed subject matter.

Referring now to FIG. 3 showing a flowchart diagram of a method of accessing data, in accordance with some exemplary embodiments of the disclosed subject matter.

On Step 300, a certified purpose for the data may be identified. In some exemplary embodiments, a central data structure may retain for each data item information as to which purpose it is authorized. In some exemplary embodiments, a hash filter may be used to determine for an identification of a data item whether the data is authorized for a certain purpose. Each purpose may be associated with a different hash filter. On Step 300, each purpose for which the service provider is certified may be checked as a potential purpose to be used for accessing the data. In some exemplary embodiments, the service provider's code may be configured to check a specific purpose when the data is about to be used for that purpose. For example, on an ad matching module, only advertisement purpose may be checked, while on a module that checks for a risk of a heart attack, only medical purpose may be checked.

On Step 310, a decryption key for the certified purpose may be obtained. The decryption key may be obtained from a PCA module, such as 110 of FIG. 1. The decryption key may be initially obtained from the PCA module and retained locally by the service provider. Additionally, or alternatively, the decryption key may be obtained on-demand, when required to be used.

On Step 320, the decentralized ledger, such as 130 of FIG. 1, may be accessed to obtain a link related to the data and associated with the certified purpose. For example, and referring to the example illustrated in FIG. 1A, if the certified purpose is purpose B, $Link_B$ 174 may be obtained. In some exemplary embodiments, the service provider may gain access to the link based on an object representing the data. The object representing the data may be a unique identifier thereof. Additionally, or alternatively, the object representing the data may be a record retaining pairs of fields—a field indicating a purpose and field comprising the location of the link in the decentralized ledger. Additionally, or alternatively, the record may be retained in the decentralized ledger and obtained based on an identifier of the data. Additionally, or alternatively, in order to preserve privacy and avoid publishing for a specific data item for what purposes it can be used, each record may retain an ID for each potential purpose. Some of the IDs may point to links to unusable aliases, and some may point to useable aliases. Additionally, or alternatively, in order to preserve the privacy and avoid creating unnecessary links, the object may not be retained in the decentralized ledger or in any other publicly accessible location and instead be privately shared with service provider using the data. The IDs in the record may be used to locate the relevant links in the decentralized ledger. In some exemplary embodiments, content of the data may be retained in different location than the decentralized ledger, such as in data holder, such as 101 of FIG. 1A.

The obtained link of Step 320 may be encrypted using an encryption key associated with the certified purpose.

On Step 330, the encrypted link obtained on Step 320 may be decrypted using the decryption key obtained on Step 310.

On Step 340, the content of the decrypted link may be examined and utilized to reach the alias. The decrypted link may be traversed thereby obtaining the alias.

On Step 350, the alias may be traversed as well to reach the content of the data item. It is noted that if the alias is eliminated, as is exemplified in FIG. 1B, on Step 350, the traversal would fail. In some exemplary embodiments, prior to traversing the alias, it may be examined and compared with a predetermined NULL alias, indicating eliminated alias. If a NULL alias is identified, the service provider may be notified that the certified purpose has been revoked and the data item may not be used for such purpose.

On Step 360, the data which was obtained on Step 350 may be utilized. The data may be used for processing related to the authorized purpose. In some exemplary embodiments, the PCA may certify the service provider by examining its code and ensuring that the code that accesses the data while stating a specific purpose indeed limits itself to utilizing the data only for that specific purpose.

Figure 4:
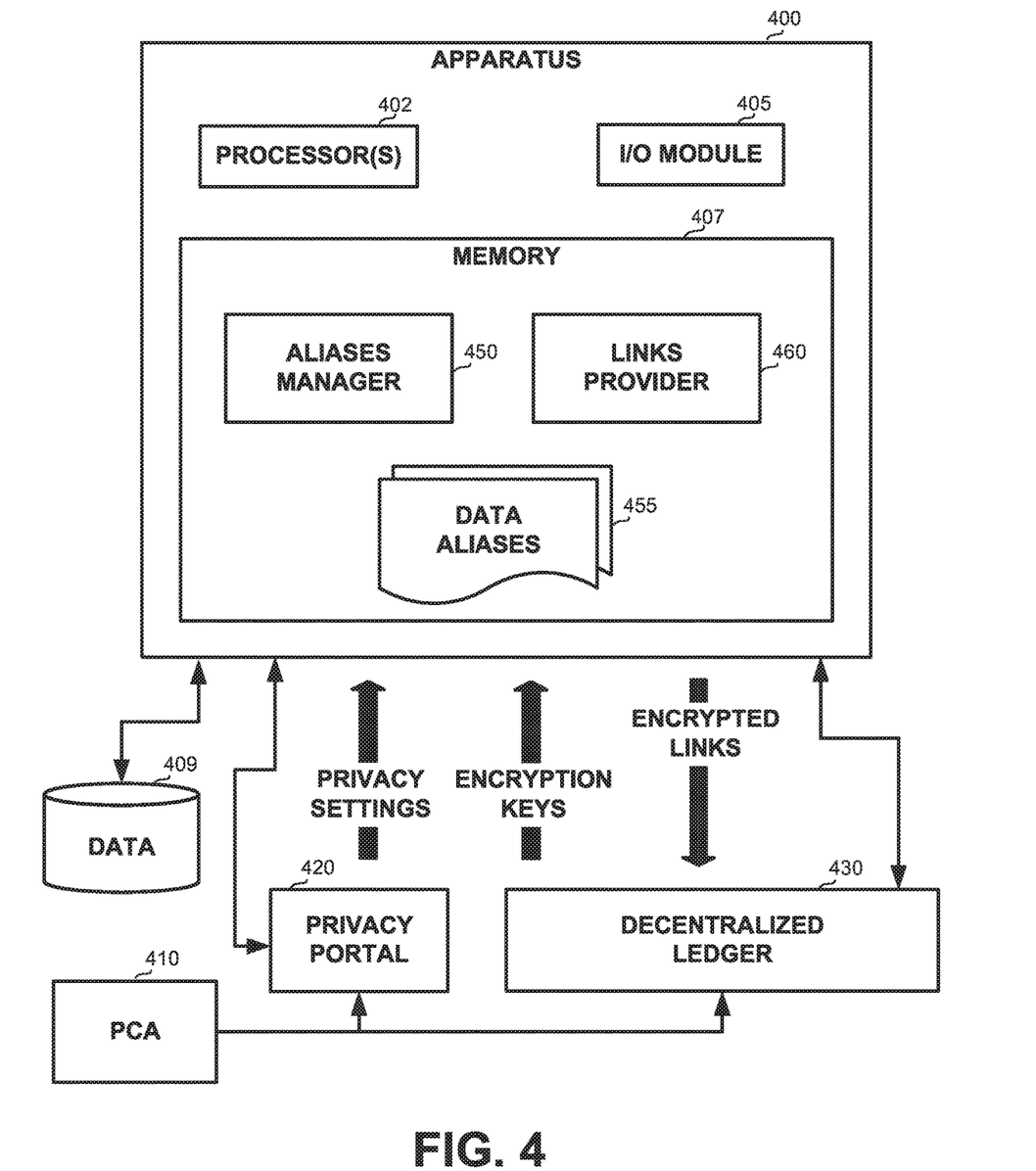
FIG. 4 shows a block diagram of an apparatus, in accordance with some exemplary embodiments of the disclosed subject matter.

Referring now to FIG. 4 showing a block diagram of an apparatus, in accordance with some exemplary embodiments of the disclosed subject matter.

In some exemplary embodiments, Apparatus 400 may comprise one or more Processor(s) 402. Processor 402 may be a Central Processing Unit (CPU), a microprocessor, an electronic circuit, an Integrated Circuit (IC) or the like. Processor 402 may be utilized to perform computations required by Apparatus 400 or any of it subcomponents.

In some exemplary embodiments of the disclosed subject matter, Apparatus 400 may comprise an Input/Output (I/O) module 405. I/O Module 405 may be utilized to provide an output to and receive input from a user, communicate with PCA Module 410, Privacy Portal 420, Decentralized Ledger 430, or the like.

In some exemplary embodiments, Apparatus 400 may comprise Memory 407. Memory 407 may be a hard disk drive, a Flash disk, a Random Access Memory (RAM), a memory chip, or the like. In some exemplary embodiments, Memory 407 may retain program code operative to cause Processor 402 to perform acts associated with any of the subcomponents of Apparatus 400. In some exemplary embodiments, Memory 407 may be used to retain Data Aliases 455, such as 162, 164 of FIG. 1A. Additionally, or alternatively, Memory 407 may be used to retain content of the data itself, such as Data 109 of FIG. 1A. Additionally, or alternatively, the data and/or aliases may be retained in a Data Holder 409, such as 101 of FIG. 1A.

In some exemplary embodiments, Aliases Manager 450 may be configured to manage the Data Aliases 455. Aliases Manager 450 may be configured to create aliases for each purpose authorized for a data item. Aliases Manager 450 may be configured to render aliases unusable if a permission for a certain purpose is revoked. Aliases Manager 450 may be configured to operate based on privacy settings which may be defined and provided by Privacy Portal 420.

In some exemplary embodiments, Links Provider 460 may be configured to provide links to aliases. Links Provider 460 may be configured to encrypt the links and upload the encrypted links to Decentralized Ledger 430.

In some exemplary embodiments, the encryption keys may be obtained from the Internet, from a cloud, or the like. Additionally, or alternatively, the encryption keys may be publicly available, for example in Decentralized Ledger 430.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    obtaining, for data of a subject, an approval for usage of the data for a use purpose, wherein the use purpose comprises a type of application of the data, wherein the approval does not approve usage of the data for another use purpose different than the use purpose, wherein the another use purpose comprises at least one different type of application of the data, wherein the data relates to the subject;
    obtaining an encryption key associated with the use purpose, wherein a decryption key is required for decrypting information encrypted with the encryption key;

generating a link to a pointer, the pointer pointing to the data of the subject, the pointer being associated with the use purpose, wherein the link enables a computer to retrieve the pointer from a storage;

encrypting the link to the pointer with the encryption key to obtain an encrypted link to the pointer; and providing access to the encrypted link, wherein said providing access to the encrypted link comprises publishing the encrypted link on a publicly accessible storage, whereby access to the data is obtainable by decrypting the encrypted link with the decryption key to obtain the pointer, and using the pointer to access the data of the subject.

2. The method of claim 1, further comprising:

responsive to withdrawing approval for usage of the data for the use purpose, eliminating usability of the pointer to access the data of the subject, whereby access to the data via the link to the pointer is prevented.

3. The method of claim 2, wherein said eliminating usability of the pointer comprises modifying the pointer to point to a different data than the data of the subject or modifying the pointer to not point to any data, wherein after said eliminating, the encrypted link to the pointer is obtainable, whereby access to the data of the subject via the link is prevented by the pointer being unusable.

4. The method of claim 1, wherein the use purpose comprises one of the group consisting of: a commercial purpose, a medical purpose, and a navigation purpose.

5. The method of claim 1, further comprising:

responsive to receiving approval for usage of the data for a second use purpose, wherein the second use purpose comprises a second type of application of the data, performing the steps of:

obtaining a second encryption key associated with the second use purpose, wherein a second decryption key is required for decrypting information encrypted with the second encryption key;

generating a second link to a second pointer, the second pointer pointing to the data, the second pointer is different than the pointer, the second pointer being associated with the second use purpose;

encrypting the second link to the second pointer with the second encryption key to obtain a second encrypted link; and providing access to the second encrypted link, whereby access to the data of the subject is obtainable by decrypting the second encrypted link with the second decryption key to obtain the second pointer and using the second pointer to access the data.

6. The method of claim 5, further comprising:

responsive to withdrawing approval for usage of the data for the second use purpose, eliminating usability of the second pointer to access the data, whereby access to the data via the second link to the second pointer is prevented while access to the data via the encrypted link to the pointer is maintained.

7. The method of claim 5, further comprising:

responsive to withdrawing approval for usage of the data for the use purpose, eliminating usability of the pointer to access the data, whereby access to the data via the encrypted link to the pointer is prevented while access to the data via the second link to the second pointer is maintained.

8. The method of claim 1, wherein said providing access to the encrypted link is performed using a decentralized ledger, whereby the encrypted link to the pointer pointing to the data becomes permanently obtainable from an undeletable record in the decentralized ledger.

9. The method of claim 8, wherein preventing access to the data is achieved responsive to a withdrawal of approval or a change in policy of usage of the data for the use purpose by rendering the pointer to be unusable.

10. The method of claim 1, wherein distribution of the decryption key to one or more recipients is performed by a Purpose Certification Authority (PCA) module configured for enforcing data usage policy on each recipient, whereby usage of the data accessed by the recipient via the encrypted link to the pointer is enabled for the use purpose and prevented for another use purpose different than the use purpose, wherein the another use purpose comprises the different type of application of the data.

11. The method of claim 1, wherein access to the data is provided in a black-box computing environment configured for processing the data to obtain an output, whereby enabling obtaining the output without obtaining the data.

12. The method of claim 1, wherein the approval for usage of the data for the use purpose is provided by the subject or per policy, wherein the data comprises personal data of the subject.

13. An apparatus having a processor and coupled memory, the processor being adapted to perform:

obtaining, for data of a subject, an approval for usage of the data for a use purpose, wherein the use purpose comprises a type of application of the data, wherein the approval does not approve usage of the data for another use purpose different than the use purpose, wherein the another use purpose comprises at least one different type of application of the data, wherein the data relates to the subject;

obtaining an encryption key associated with the use purpose, wherein a decryption key is required for decrypting information encrypted with the encryption key;

generating a link to a pointer, the pointer pointing to the data of the subject, the pointer being associated with the use purpose, wherein the link enables a computer to retrieve the pointer from a storage;

encrypting the link to the pointer with the encryption key to obtain an encrypted link to the pointer; and providing access to the encrypted link, wherein said providing access to the encrypted link comprises publishing the encrypted link on a publicly accessible storage, whereby access to the data is obtainable by decrypting the encrypted link with the decryption key to obtain the pointer, and using the pointer to access the data of the subject.

14. The apparatus of claim 13, wherein said processor is configured to perform:

responsive to withdrawing approval for usage of the data for the use purpose, eliminating usability of the pointer to access the data, whereby access to the data via the encrypted link to the pointer is prevented.

15. The apparatus of claim 13, wherein said processor is configured to perform:

responsive to receiving approval for usage of the data for a second use purpose:

obtaining a second encryption key associated with the second use purpose, wherein a second decryption key is required for decrypting information encrypted with the second encryption key;

generating a second link to a second pointer, the second pointer pointing to the data, the second pointer is different than the pointer, the second pointer being associated with the second use purpose;

encrypting the second link to the second pointer with the second encryption key to obtain a second encrypted link; and providing access to the second encrypted link, whereby access to the data is obtainable by decrypting the second encrypted link with the second decryption key to obtain the second pointer, and using the second pointer to access the data.

16. The apparatus of claim 15, wherein said processor is configured to perform:

responsive to withdrawing approval for usage of the data for the second use purpose, eliminating usability of the second pointer to access the data, whereby access to the data via the second link to the second pointer is prevented while access to the data via the encrypted link to the pointer is maintained; and responsive to withdrawing approval for usage of the data for the use purpose, eliminating usability of the pointer to access the data, whereby access to the data via the encrypted link to the pointer is prevented while access to the data via the second link to the second pointer is maintained.

17. The apparatus of claim 13, wherein said providing access to the encrypted link is performed using a decentralized ledger, whereby the encrypted link to the pointer pointing to the data becomes permanently obtainable from an undeletable record in the decentralized ledger.

18. The apparatus of claim 13, wherein distribution of the decryption key to one or more recipients is performed by a Purpose Certification Authority (PCA) module configured for enforcing data usage policy on each recipient, whereby usage of data accessed by the recipient via the encrypted link to the pointer is enabled for the use purpose and prevented for another use purpose different than the use purpose.

19. A non-transitory computer readable medium retaining program instructions, which program instructions when read by a processor, cause the processor to perform:

obtaining, for data of a subject, an approval for usage of the data for a use purpose, wherein the use purpose comprises a type of application of the data, wherein the approval does not approve usage of the data for another use purpose different than the use purpose, wherein the another use purpose comprises at least one different type of application of the data, wherein the data relates to the subject;

obtaining an encryption key associated with the use purpose, wherein a decryption key is required for decrypting information encrypted with the encryption key;

generating a link to a pointer, the pointer pointing to the data of the subject, the pointer being associated with the use purpose, wherein the link enables a computer to retrieve the pointer from a storage;

encrypting the link to the pointer with the encryption key to obtain an encrypted link; and providing access to the encrypted link, wherein said providing access to the encrypted link comprises publishing the encrypted link on a publicly accessible storage, whereby access to the data is obtainable by decrypting the encrypted link with the decryption key to obtain the pointer, and using the pointer to access the data of the subject.

20. The non-transitory computer readable medium of claim 19, wherein the program instructions further cause the processor to perform:

responsive to receiving approval for usage of the data for a second use purpose, obtaining a second encryption key associated with the second use purpose, wherein a second decryption key is required for decrypting information encrypted with the second encryption key; generating a second link to a second pointer, the second pointer pointing to the data of the subject, the second pointer is different than the pointer, the second pointer being associated with the second use purpose; encrypting the second link to the second pointer with the second encryption key to obtain a second encrypted link; and providing access to the second encrypted link, whereby access to the data is obtainable by decrypting the second encrypted link with the second decryption key to obtain the second pointer and using the second pointer to access the data;

responsive to withdrawing approval for usage of the data for the use purpose, eliminating usability of the pointer to access the data; and responsive to withdrawing approval for the usage of the data for the second use purpose, eliminating usability of the second pointer to access the data.

* * * * *